United States Patent [19]

Cohen

[11] 4,275,028

[45] Jun. 23, 1981

[54] PLASTIC ORNAMENT AND METHOD OF MAKING SAME

[75] Inventor: Melvin Cohen, Roslyn Heights, N.Y.

[73] Assignee: Holiday Industries, Inc., Bronx, N.Y.

[21] Appl. No.: 114,892

[22] Filed: Jan. 24, 1980

[51] Int. Cl.³ .......................... B29C 27/00; B29F 5/00
[52] U.S. Cl. ...................................... 264/126; 156/63; 156/196; 156/308.2; 156/309.6; 264/245; 264/248; 264/313; 264/320; 264/334; 264/337
[58] Field of Search ........................ 428/240, 281, 283; 156/228, 308.2, 309.6, 63, 196; 264/248, 313, 337, 334, 245, 246, 247, 257, 73, 126, 320

[56] References Cited

U.S. PATENT DOCUMENTS

| | | | |
|---|---|---|---|
| 1,635,684 | 7/1927 | Mell | 264/245 |
| 3,187,072 | 6/1965 | Morin | 264/242 |
| 3,308,226 | 3/1967 | Simjian | 264/245 |
| 3,315,374 | 4/1967 | Geraty | 156/63 |
| 3,414,642 | 12/1968 | Baum | 264/126 |
| 3,461,016 | 8/1969 | Irving et al. | 264/126 |
| 3,479,501 | 11/1969 | Pisciotta et al. | 156/63 |
| 3,666,582 | 5/1972 | Kauffman et al. | 156/63 |
| 3,787,277 | 1/1974 | Oomen et al. | 428/240 |
| 3,846,214 | 11/1974 | Rosenzwieg et al. | 156/63 |
| 4,076,567 | 2/1978 | Yoshikawa et al. | 264/126 |

OTHER PUBLICATIONS

Brandrup et al., Polymer Handbook, Interscience, N.Y. (1966) pp. 111-46, 111-65, through 111-71, 111-2, 111-6, 111-8 through 111-11.

*Primary Examiner*—W. E. Hoag
*Attorney, Agent, or Firm*—Cooper, Dunham, Clark, Griffin & Moran

[57] ABSTRACT

A plastic ornament and a method of making the ornament. Plastic pellets are placed in the holes of a mesh according to a predetermined pattern, each hole being sized to accommodate a single pellet. The pellets and mesh are heated until the pellets begin to fuse together. The mesh is then separated from the fused pellets. The fused pellets may be heated further until the plastic ornament achieves the desired smoothness.

8 Claims, 1 Drawing Figure

PLASTIC ORNAMENT AND METHOD OF MAKING SAME

BACKGROUND OF THE INVENTION

This invention relates to ornamental plastic articles and to a method of making these articles from plastic pellets.

Several methods of making plastic ornaments from pellets are known in the prior art. In U.S. Pat. No. 3,523,031, a method of producing ornamental sheets is described wherein plastic pellets are spread evenly but randomly on a tacky sheet, the pellets are heated to fuse them to each other and to the tacky sheet, and then the pellets and sheet are cooled. The final product is an ornamental plastic sheet incorporating the pellets and the tacky sheet.

U.S. Pat. No. 3,414,642 discloses a method in which plastic pellets are randomly spread in a tray having removable inner partitions, the pellets are heated to congeal them, the partitions are removed, and the pellets are reheated. The product is a unitary sheet resembling stained glass panels.

A method similar to the above is utilized in home decoration kits which are sold commercially. The kits provide metallic frames of various designs. The frames are placed on a tray or cookie sheet and plastic pellets are distributed randomly in the open sections of the frame. The pellets are heated in an oven until they have melted to a smooth sheet and then removed from the oven. The frame forms part of the resulting decoration.

It is an object of the present invention to provide a method of producing plastic articles from plastic pellets wherein the plastic pellets are distributed according to a predetermined arrangement and not randomly.

It is a related object to provide a method of producing plastic articles from plastic pellets wherein the plastic pellets are distributed according to any pattern chosen by the user.

It is another object to provide a method of producing plastic articles from plastic pellets of various colors.

It is another object to provide a method of making plastic articles from plastic pellets wherein uniform layers of pellets can be placed atop one another.

It is a further object to provide a method of producing plastic articles in a variety of surface textures.

It is a still further object to provide a method of making plastic articles from plastic pellets which is safe, inexpensive, easy to use and which can readily be adapted for home use.

These and other objects are accomplished by means of the present invention.

SUMMARY OF THE INVENTION

The present invention provides a method of making a plastic product by placing plastic pellets into the holes of a mesh according to a predetermined pattern, each hole of the mesh accommodating a single pellet, heating the pellets and mesh to congeal the pellets into the chosen pattern, and then separating the congealed pellets from the mesh. The fused pellets may then be reheated for further melting until any desired texture is obtained.

The present invention also provides a plastic product made in accordance with the above-described method.

DETAILED DESCRIPTION OF THE INVENTION

Referring to the illustrated embodiment, a mesh or screen denoted by the number 10 is formed with holes 12, desirably of uniform size. Plastic pellets 14 in bead or any other suitable form are placed in holes 12 of the mesh. Each hole of the mesh is sized to accommodate a single plastic pellet and to keep it in place. Holes 12 are spaced so that each pellet touches, or almost touches, the pellets placed in adjacent holes. The pellets may be of any color and are distributed according to any definite arrangement. Thus, the user is not confined to any particular configuration, but may choose to depict a figure, a scene or any other of an infinite number of designs.

Plastic pellets 14 may be made from any convenient thermoplastic material, such as acetates, acrylics, polystyrenes, and the like. The mesh 10 may be formed from any suitable material, such as steel, Teflon, and the like, so long as the material has a higher melting point than the pellets. Preferably, the mesh is formed from extruded polypropylene.

Figure 1:
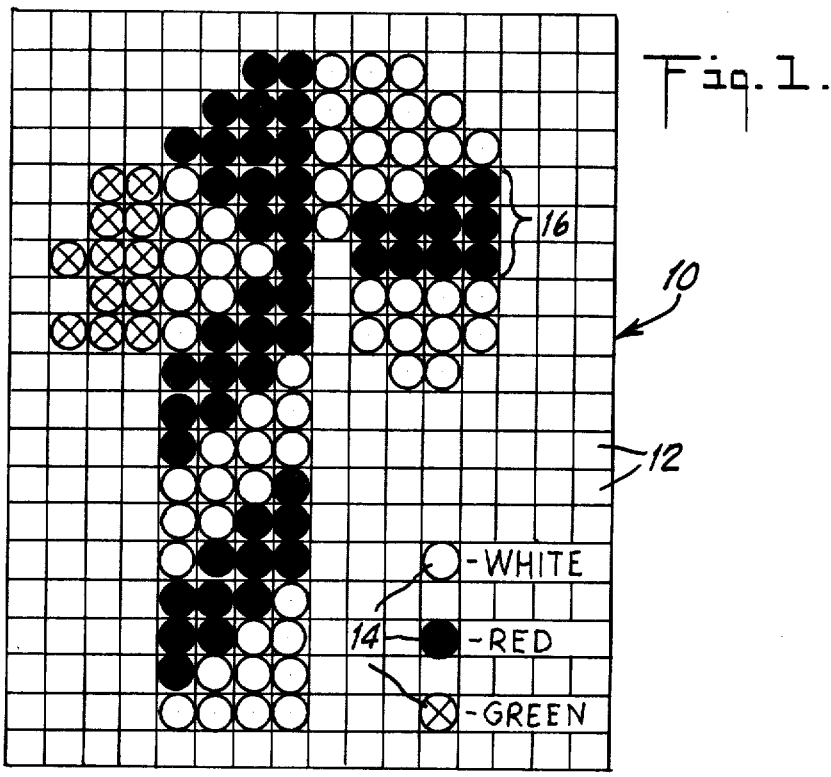
Figure 2:
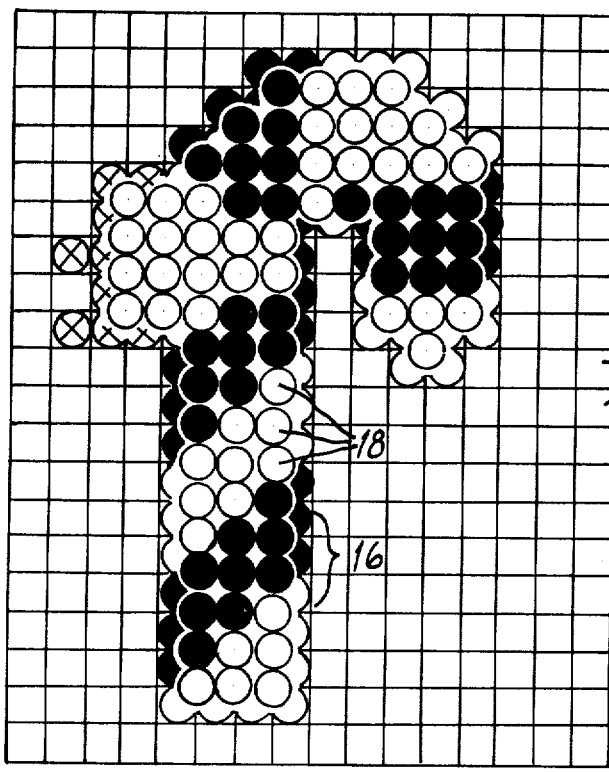
Figure 3:
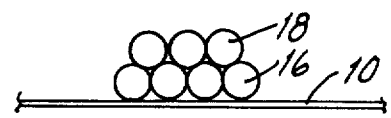

After a first layer of pellets 16 are arranged in the mesh according to the pattern chosen, the user may choose to place additional layers of pellets 18 atop the first layer. When the pellets are in the form of round beads, an upper layer of beads will fit into the gaps made by the layer below, as illustrated in FIGS. 2 and 3. Again, the user may choose from an infinite variety of colors and designs in arranging the pellets of the upper layers. It is anticipated, however, that the user will select colors and a design for the upper layers which will enhance the arrangement of the layers below.

With the mesh and pellets prepared as described, the pellets are heated until they begin to melt together and to adhere to each other. The heating may be accomplished by any conventional method, as by baking the pellets and mesh in an oven or by placing them under an infrared lamp. The temperature and heating time are controlled so that the mesh does not melt and so that the pellets substantially maintain their original configuration.

It should be understood that the temperature and time required for this step depends on the particular plastic material used. The duration of the heating is also a function of the number of layers of pellets since the more the number of layers, the longer the time required to achieve the proper degree of adherence. Typically, it has been found that heating in an oven at a temperature of about 350° F. (ca. 175° C.) for approximately four to seven minutes achieves the necessary degree of coalescence.

Following this initial heating, the mesh and fused pellets are allowed to cool. Since the heating step is controlled to prevent melting of the mesh, there is little if any adherence of the pellets to the mesh. The fused pellets may easily be separated from the mesh.

After separating the fused pellets from the mesh, the pellets may be reheated until melting occurs to form a substantially unitary mass. By regulating both the heating time and the temperature, it is possible to produce either a smooth or a textured surface, as the user desires. For example, returning the fused pellets to the oven for an additional four to five minutes at the same temperature as before produces an appealing ornament having a pebbled surface.

The method of the present invention is readily adaptable for home use. The method is safe, inexpensive, easy to use, and allows the user to be creative. The plastic ornaments produced make attractive home decorations.

While the present invention has been described by referring to certain embodiments, these references were for purposes of illustration only. Many variations will be readily apparent to those skilled in the art without departing from the spirit and scope of the present invention.

What is claimed is:

1. A method of making a self-supporting plastic product, comprising:
   (a) placing a layer of plastic pellets onto an underlying mesh according to a predetermined pattern, said mesh made from a material having a higher melting point than said plastic pellets, each hole of said mesh being sized to accommodate a single pellet;
   (b) heating the pellets and mesh to cause the pellets to fuse to each other into a self-supporting structure according to the predetermined pattern;
   (c) allowing the fused pellets and the mesh to cool; and
   (d) separating the mesh from the fused pellets.

2. A method as described in claim 1, also comprising: further heating the fused pellets separated from the mesh to achieve the desired surface texture.

3. A method as described in claim 1 or 2, wherein the mesh is made from a polypropylene having a higher melting point than the plastic pellets.

4. A method as described in claim 1, 2, or 3, wherein the plastic pellets are made from a material selected from the group consisting of acrylates, acetates and polystyrenes.

5. A method as described in claim 4, wherein the plastic pellets are made from a polystyrene.

6. A method as described in claim 1 or 2, wherein additional layers of plastic pellets are placed on top of the first layer.

7. A method as described in claim 1, 2 or 6 wherein, the plastic pellets are round.

8. A method as described in claim 2, 5 or 7, wherein the plastic pellets are heated in an oven at a temperature of about 350° F. for about four to seven minutes and then further heated at a temperature of about 350° F. for about four to five minutes.

* * * * *